Figure 4:
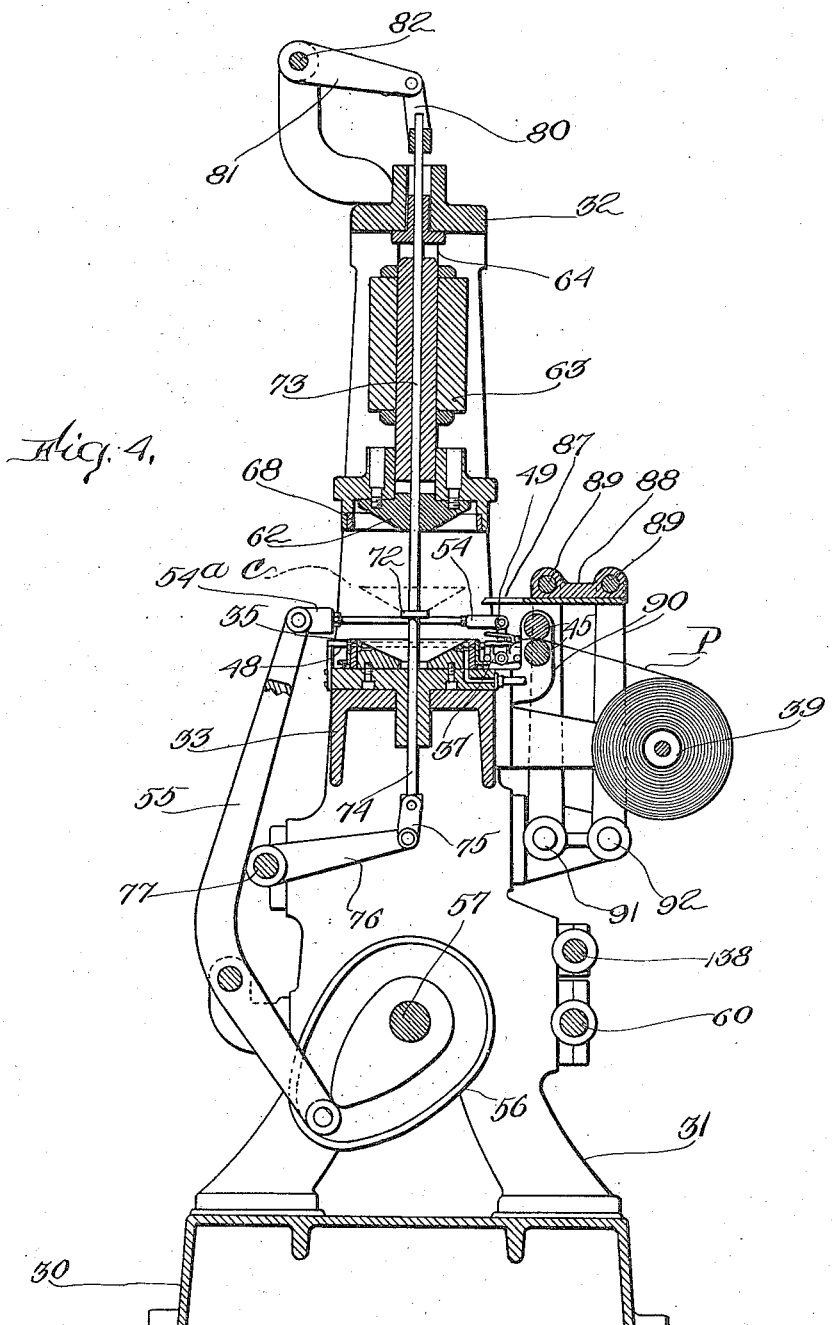

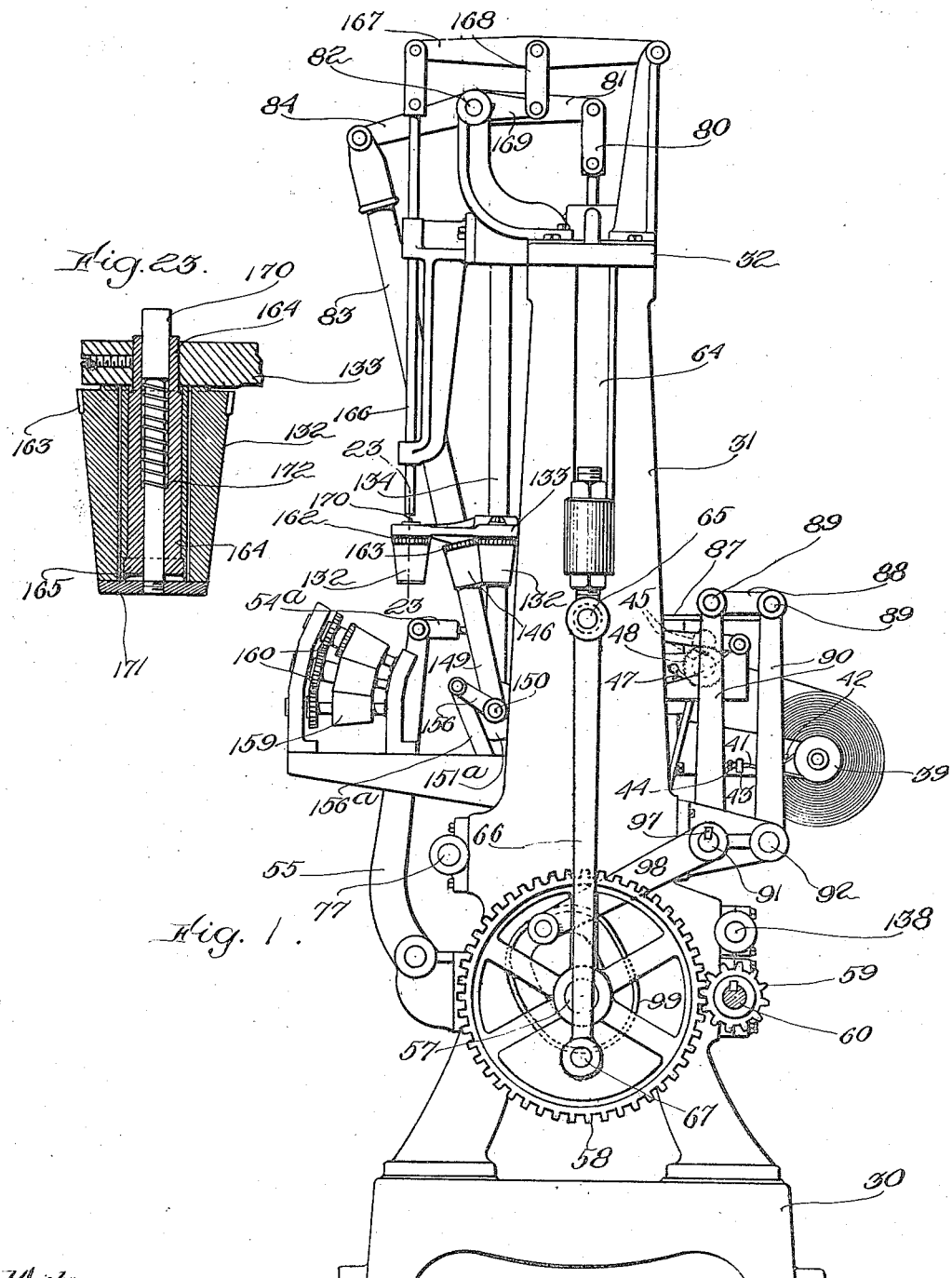

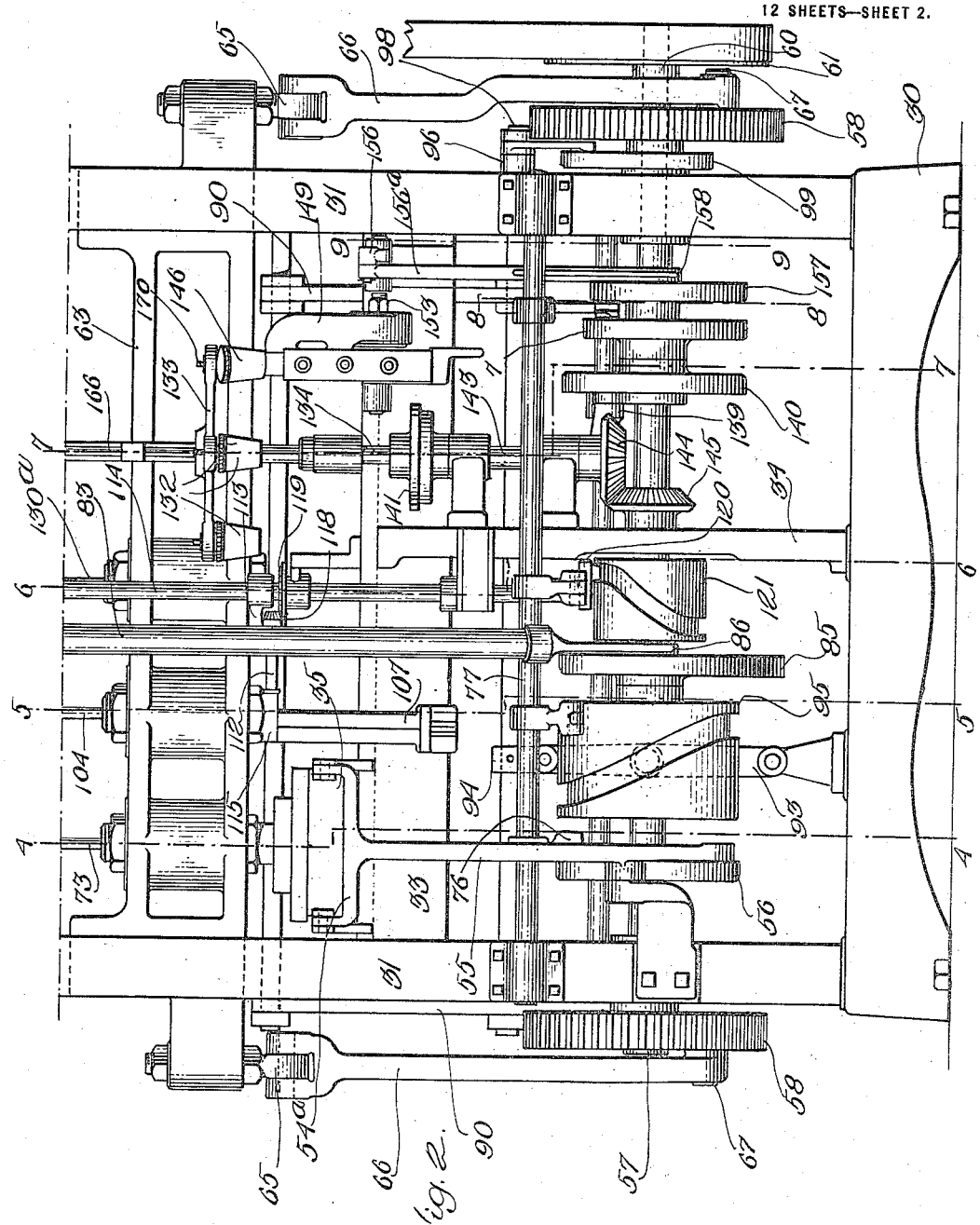

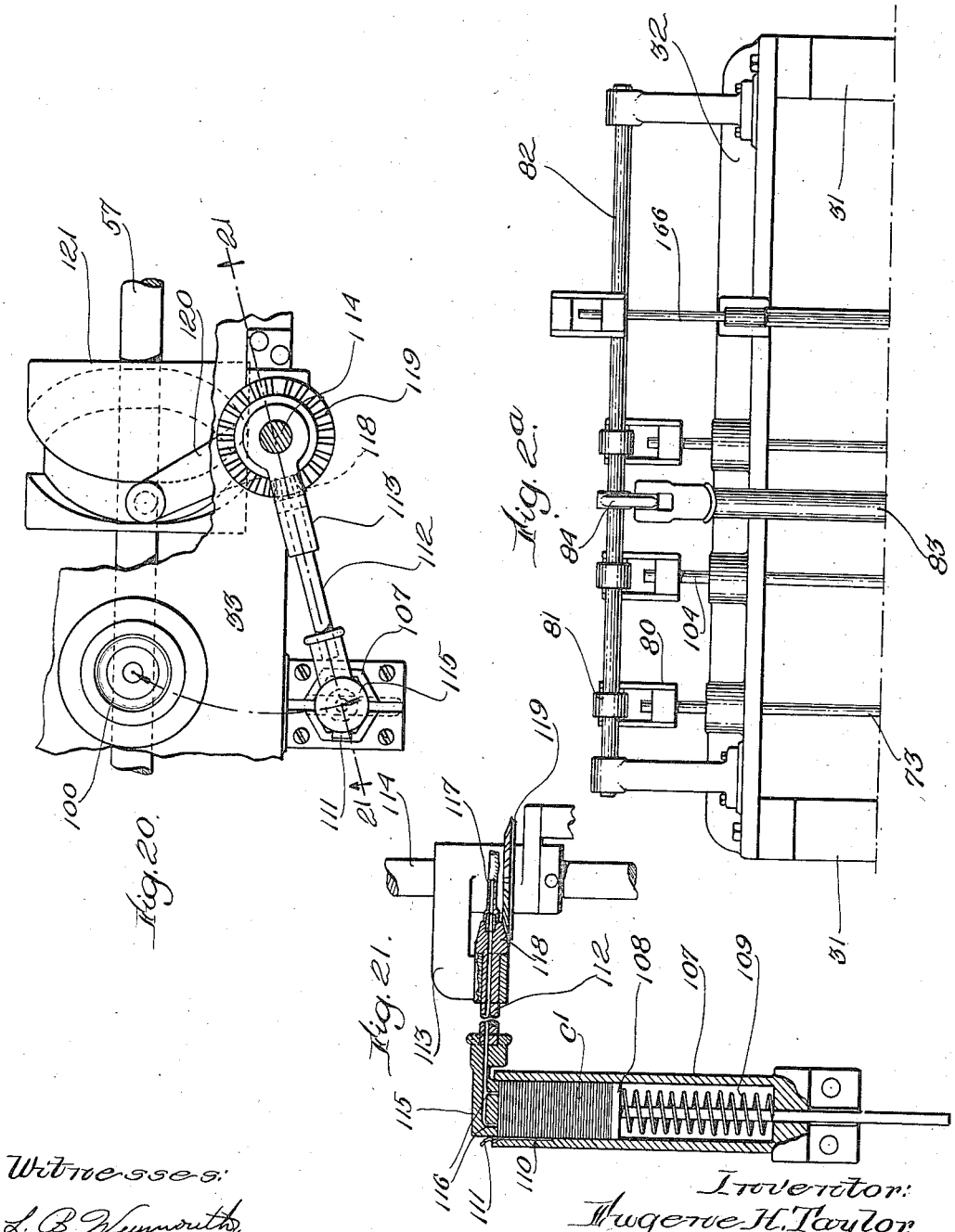

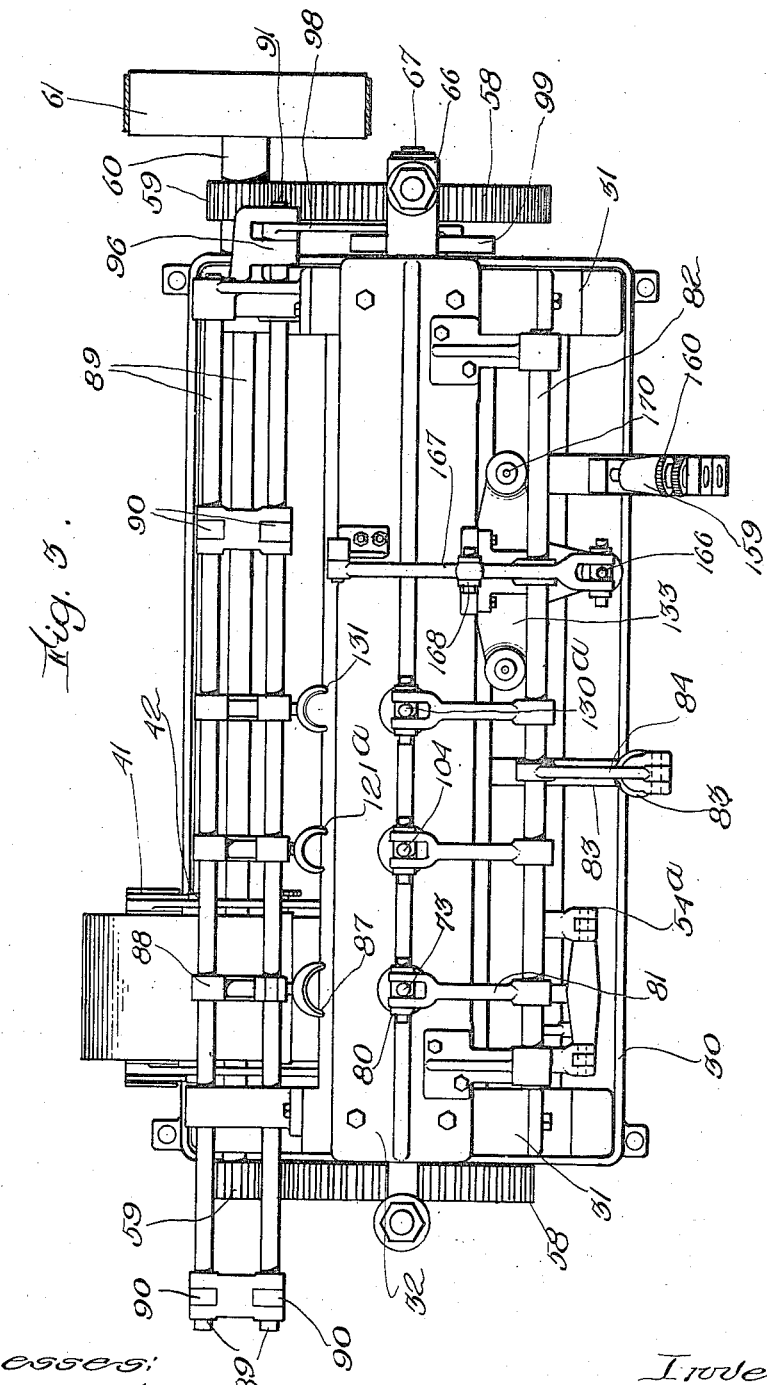

E. H. TAYLOR.
CUP MAKING MACHINE.
APPLICATION FILED OCT. 21, 1911.

1,163,572.

Patented Dec. 7, 1915.
12 SHEETS—SHEET 5.

WITNESSES:
L. B. Weymouth.
James E. Lynch.

INVENTOR.
Eugene H. Taylor,
BY
ATTORNEY.

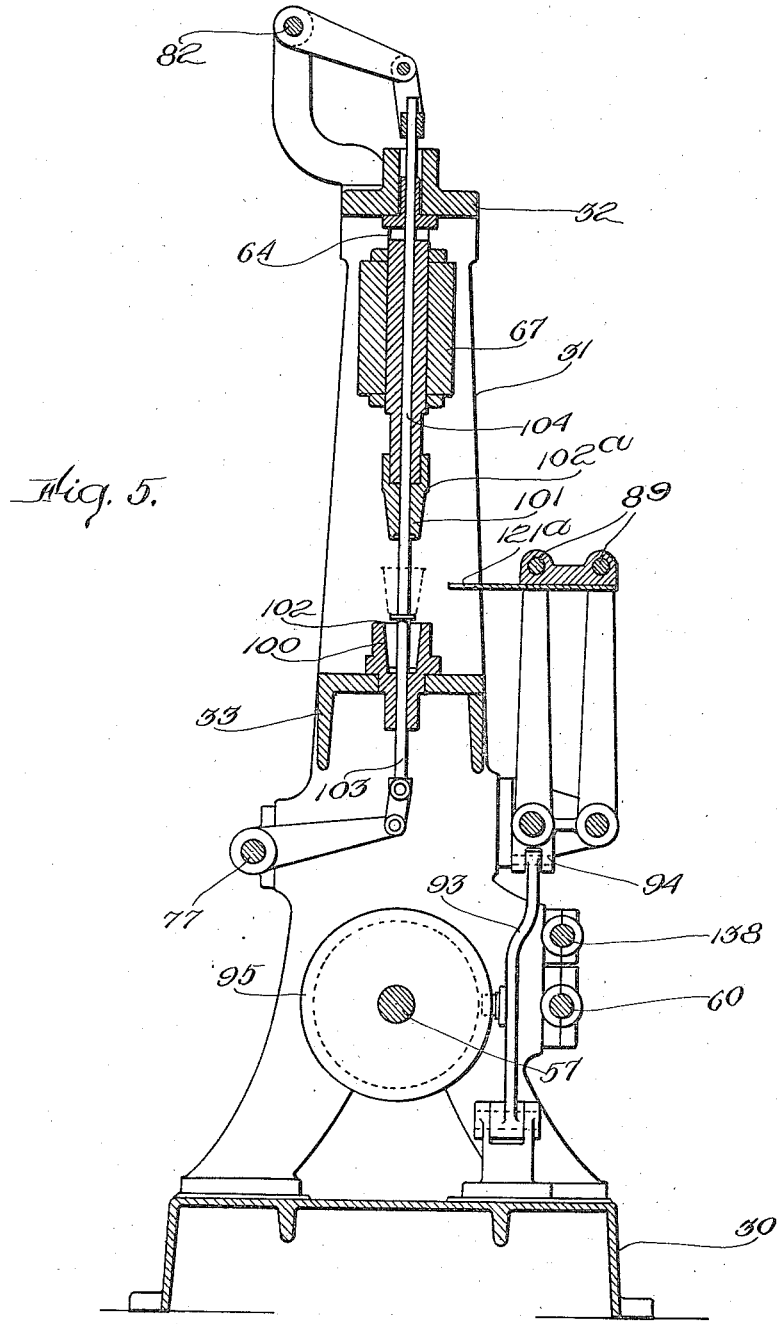

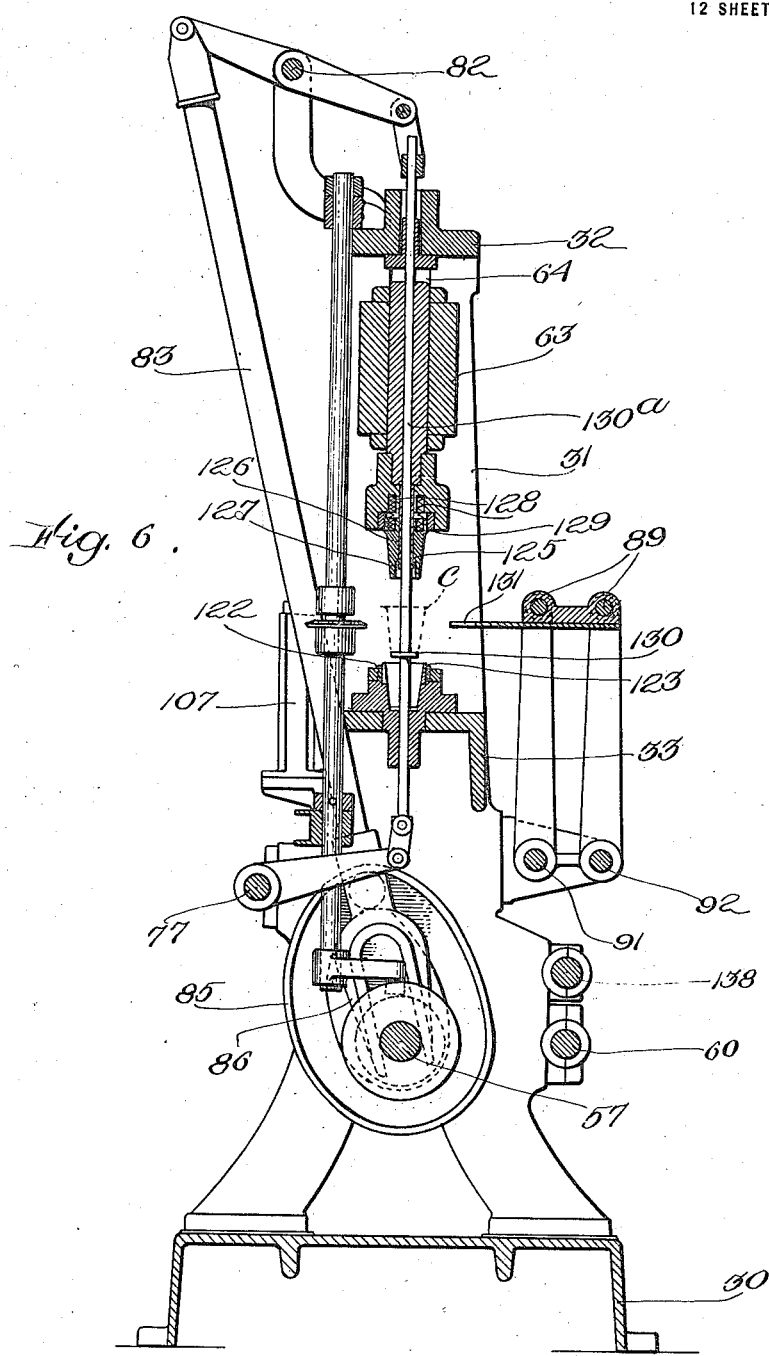

E. H. TAYLOR.
CUP MAKING MACHINE.
APPLICATION FILED OCT. 21, 1911.
1,163,572.
Patented Dec. 7, 1915.
12 SHEETS—SHEET 8.
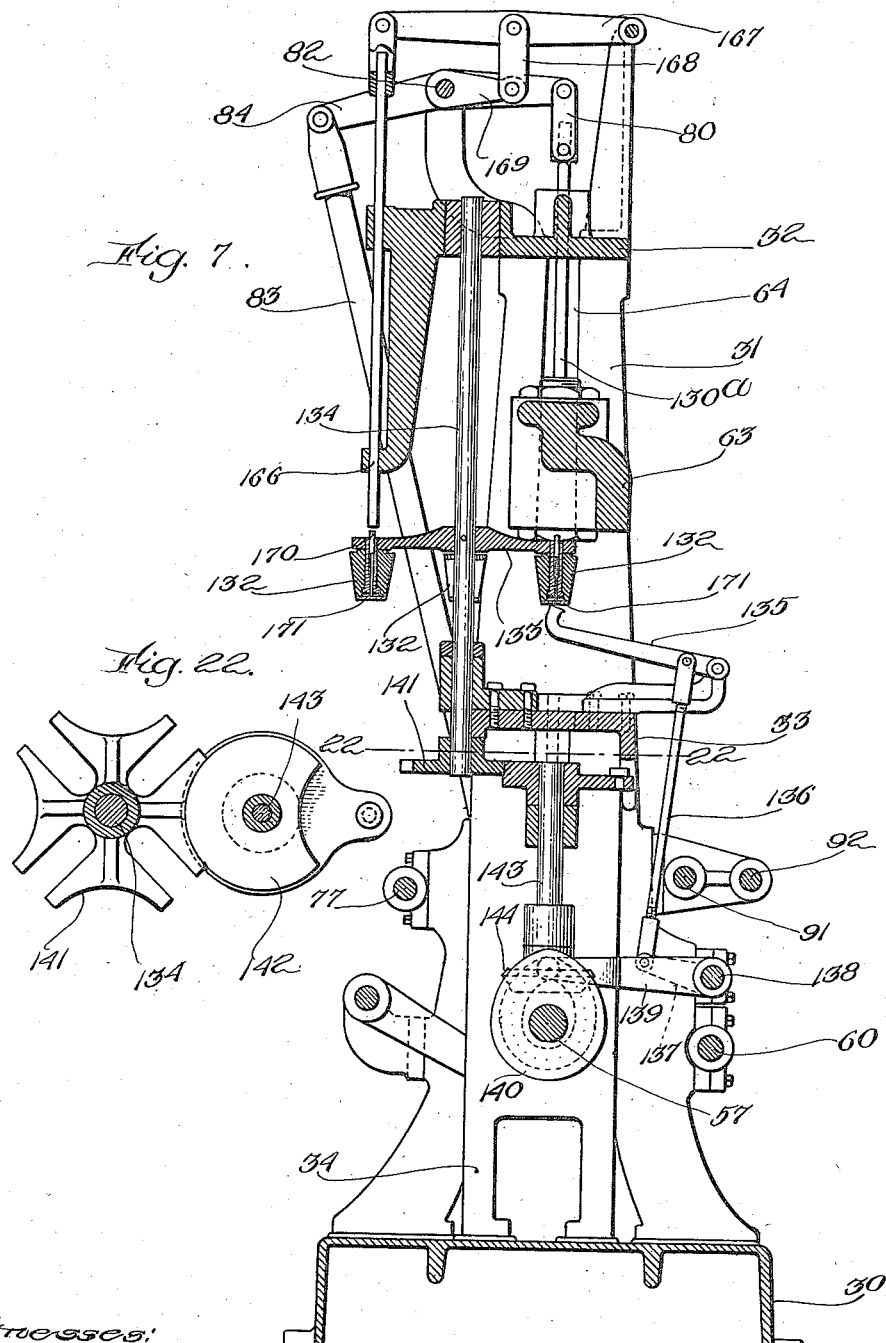

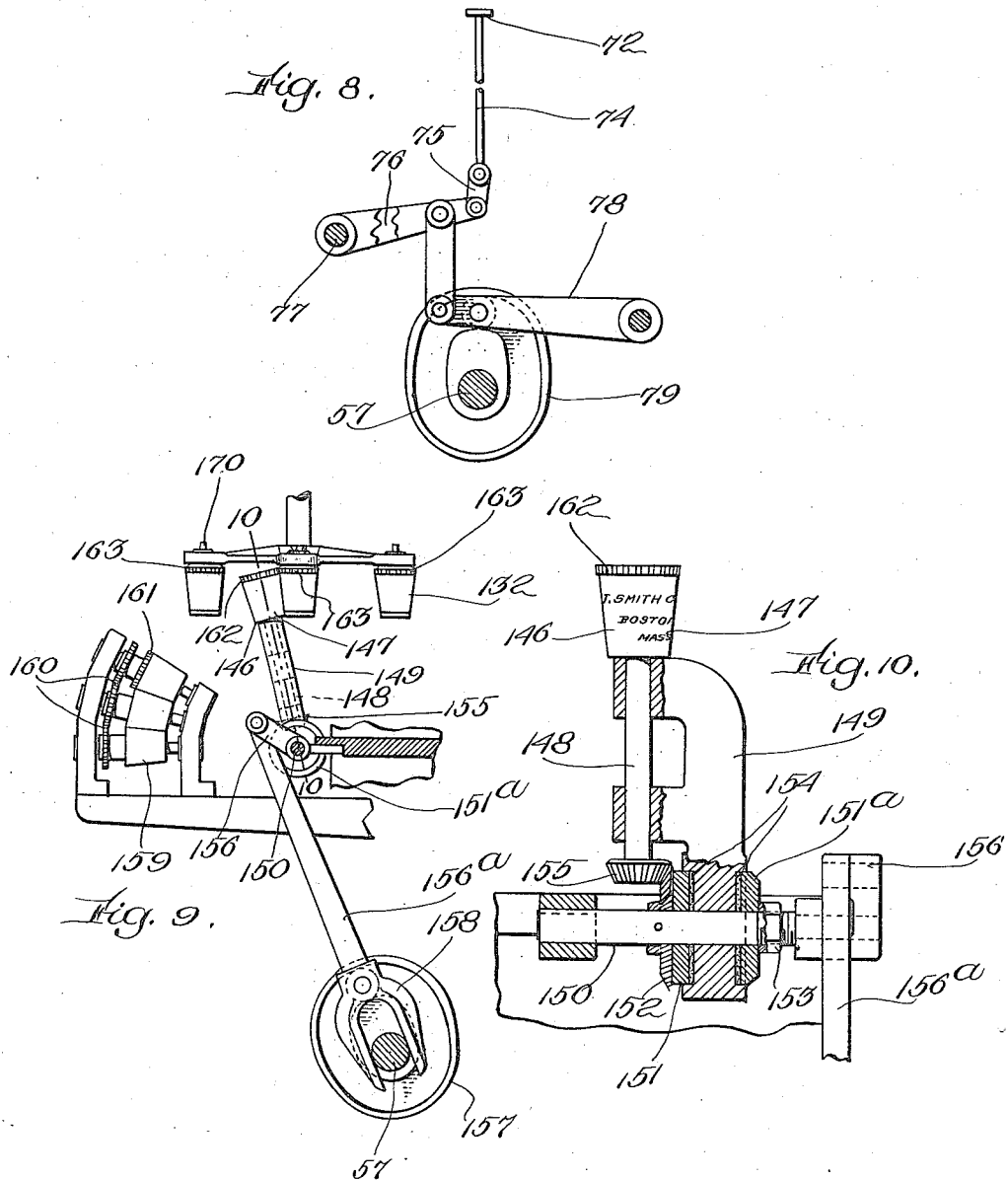

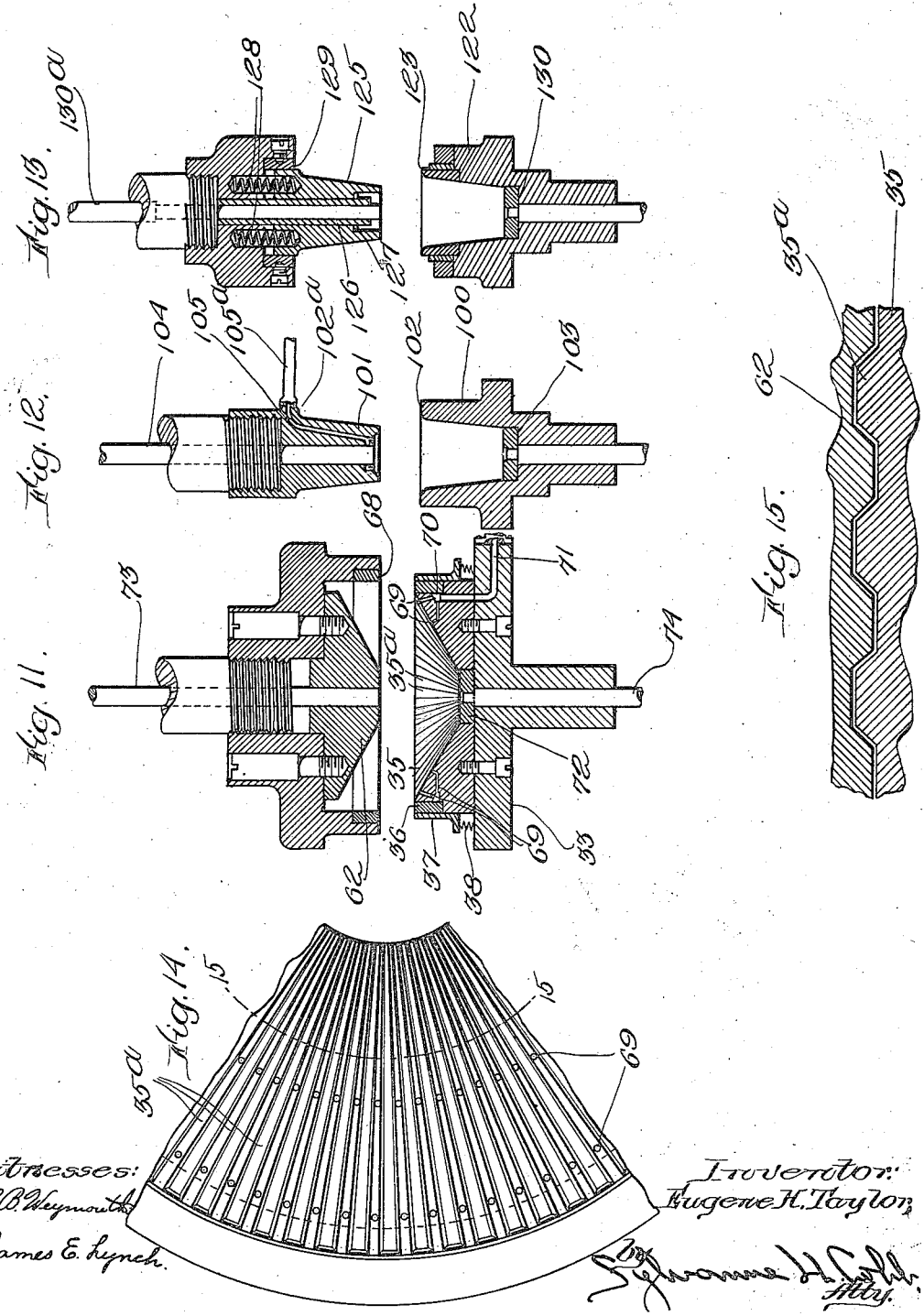

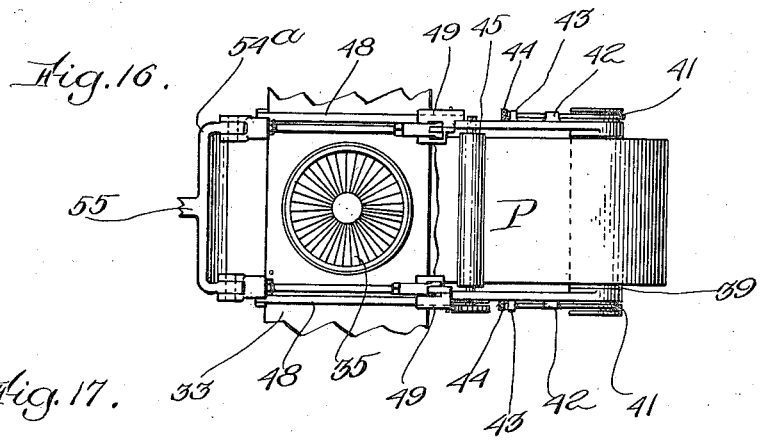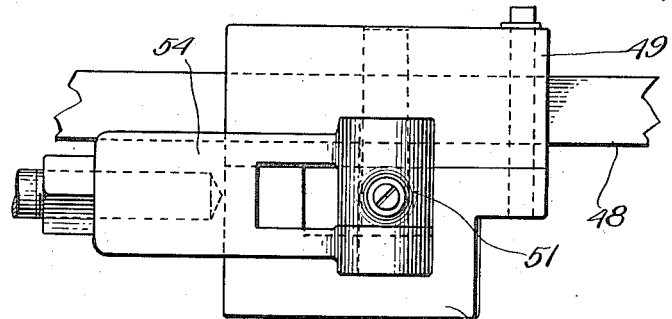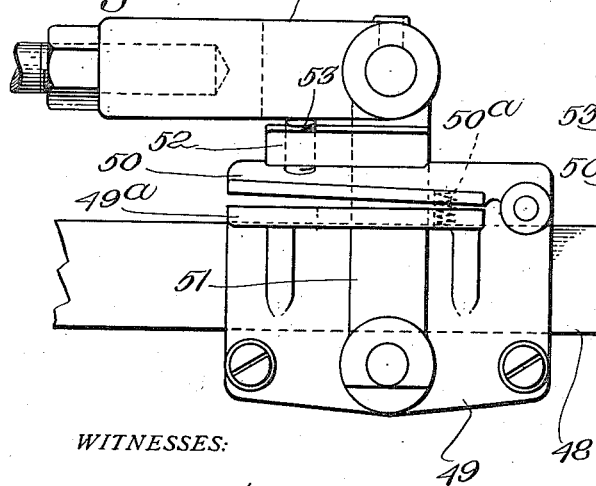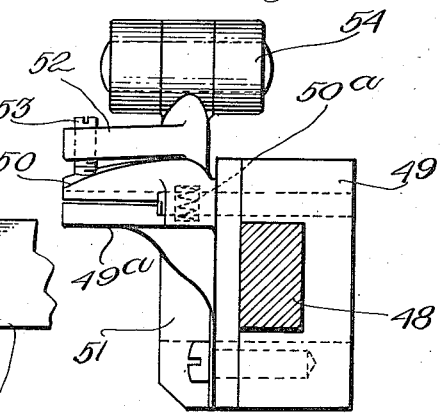

E. H. TAYLOR.
CUP MAKING MACHINE.
APPLICATION FILED OCT. 21, 1911.
1,163,572.
Patented Dec. 7, 1915.
12 SHEETS—SHEET 12.
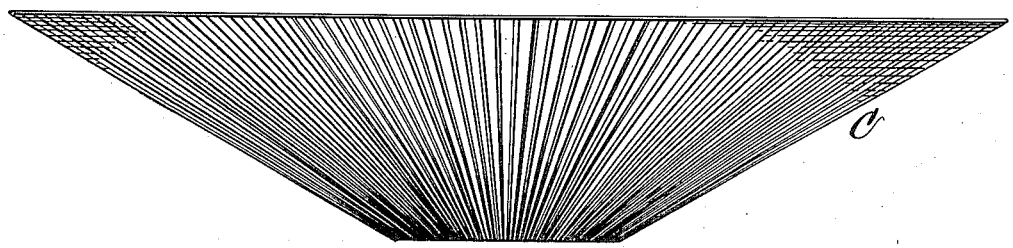
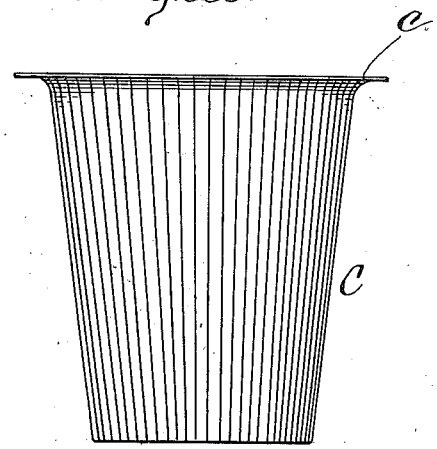
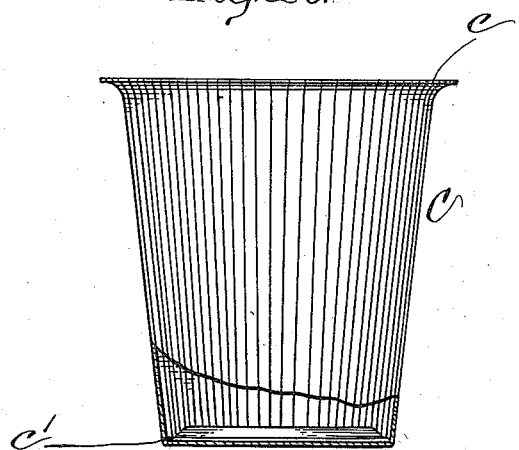
WITNESSES:
L. B. Weymouth
James E. Lynch.
INVENTOR.
Eugene H. Taylor,
BY
Sylvannus H. Cobb,
ATTORNEY.

UNITED STATES PATENT OFFICE.

EUGENE H. TAYLOR, OF HYDE PARK, MASSACHUSETTS, ASSIGNOR TO LAWRENCE W. LUELLEN, OF NEW YORK, N. Y.

CUP-MAKING MACHINE.

1,163,572.  Specification of Letters Patent.  Patented Dec. 7, 1915.

Application filed October 21, 1911. Serial No. 655,951.

*To all whom it may concern:*

Be it known that I, EUGENE H. TAYLOR, a citizen of the United States, residing at Hyde Park, in the county of Norfolk and State of Massachusetts, have invented a new and useful Cup-Making Machine, of which the following is a specification, reference being had to the accompanying sheets of drawings, in which like reference-numerals indicate like parts throughout the respective views.

My invention relates to machines for making cups and like vessels from thin, flexible material, such as paper, the body of the cup being formed from a single piece of the material.

Its chief objects are to provide a cup-making machine, which, while comparatively simple in character, shall act continuously and automatically to produce the cups from a ribbon of the material, a plurality of operations going on simultaneously. Said cups when completed contain practically all the material of the blank from which they are formed, the excess being disposed of by crimping or folding the material upon itself in plaits.

Referring to the accompanying drawings, in which I have illustrated by way of example one preferable embodiment of my invention, I will proceed to describe the same in detail.

Figure 1 illustrates an end elevation of one embodiment of my invention; Fig. 2 is a front elevation thereof, the upper portion, however, being separately shown in Fig. 2ᵃ; Fig. 3 is a top plan view; Figs. 4, 5, 6 and 7 are full vertical sections on the lines 4—4, 5—5, 6—6 and 7—7, respectively, of Fig. 2; Fig. 8 is a sectional detail on the line 8—8 of Fig. 2, illustrating cup-clearing and holding mechanism; Fig. 9 is a similar view on the line 9—9 of Fig. 2, showing the cup-printing mechanism; Fig. 10 is a partial sectional detail on the line 10—10 of Fig. 9; Figs. 11, 12 and 13 show in vertical section the three pairs of forming and cutting dies; Fig. 14 is a broken top plan view, considerably enlarged, of the female die illustrated in Fig. 11; Fig. 15 is a sectional detail on the line 15—15 of Fig. 14, still further enlarged; Fig. 16 is a top plan view of the ribbon-feeding mechanism; Fig. 17 is a similar view, enlarged, of the ribbon-gripping means; Fig. 18 is a side elevation thereof; Fig. 19 is an end elevation of the same; Fig. 20 is a top plan view of the delivery mechanism for the spacing disks; Fig. 21 is a section therethrough on the line 21—21 of Fig. 20; Fig. 22 is a horizontal section on the line 22—22 of Fig. 7, showing the stop movement for the printing mechanism; Fig. 23 is an enlarged sectional detail on the line 23—23 of Fig. 1, and Figs. 24, 25 and 26 illustrate in side elevation successive stages in the formation of the cup.

Similar characters designate like parts in all figures of the drawings.

The various elements of my improved machine are mounted upon a suitable frame comprising a base 30, end-pieces or uprights 31, 31 connected by upper and intermediate bars 32 and 33, respectively, and a standard 34 coöperating with the bar 33 and being situated between the end-pieces. Upon this intermediate bar 33 are fixed a series of female dies for operating successively upon the material. The first of these dies (Figs. 4, 11, 14 and 15) performs the preliminary operation of producing a flat blank of the material from which the cup is to be made, and then forming this into the shallow dish-shape illustrated in Fig. 24. This die 35 consists of a block having a conical depression in which are raised ribs or corrugations 35ᵃ, preferably extending in a radial direction or along elements of the cone. Surrounding the die-block 35 is a fixed annular knife 36, and encircling this is an annular doffer or clearing member 37 provided at its lower edge with a flange, between which and the bar 33 of the frame are spiral springs 38 serving to normally hold the upper edge of the doffer flush with the knife 36 (Figs. 4 and 11).

Across the top of the die 35 the paper or other material P is fed in a ribbon from a supply-roll 39 (Figs. 1, 4 and 16) journaled in a pair of arms projecting from the frame. Coöperating with the supply-roll at each end is a spring 41, passing therefrom beneath a projection 42 fixed to one of the supporting arms and then through a lug 43 also carried by the arm. Beyond the lug the spring has a cylindrical threaded portion upon which operates a thumb-nut 44. By varying the position of this thumb-nut the spring may be pressed with greater or less force upon the supply-roll and its freedom of rotation thus controlled to keep the ribbon under suitable tension. From the supply-roll the ribbon passes between retaining rolls 45, 45, rotatably mounted in frame-arms above those carrying the supply-roll, one of these rolls having upon its spindle outside the arm a ratchet-wheel 46 against which a pawl 47 is pressed by a spring. These rolls hold the ribbon in the position to which it is advanced by mechanism now to be described, preventing its reverse movement when freed. Movable upon horizontal bars 48, 48 situated upon opposite sides of the die 35 (Figs. 4 and 16 to 19, inclusive) are gripping means, each consisting of a slide 49 provided with a fixed laterally extending jaw 49ª adjacent to which is fulcrumed a movable jaw 50 pressed normally upward by a spring 50ª. Pivoted near the lower portion of the slide is a link 51, having projecting over the movable jaw an arm 52 through which operates a screw or other adjustable contact member 53. To each link is pivoted a connecting rod 54, the opposite ends of which are joined to a yoke 54ª upon a lever 55 fulcrumed near the bottom of the frame and having a projection entering a groove in a cam 56. This cam is fixed to a cam-shaft 57, extending longitudinally of and journaled in the end-pieces of the frame and having at its opposite extremities gears 58, 58 meshing with pinions 59, 59 upon a main driving shaft 60. Rotation is imparted to this driving shaft through a pulley 61 from some source of power. The end of the ribbon of paper once having been started from the supply-roll through the retaining rolls always rests across the top of the die 35, passing between the fixed and movable jaws of the feeding mechanism. As these jaws in the travel of the slides move to the right (Figs. 4, 16 and 18), each link 51, which is limited in its oscillation in this direction by contact with the slide, raises the screw 53 from the jaw 50 thus releasing the paper from the jaws. When the cam causes the link to move in the opposite direction, it brings the screw down upon the jaw 50 clamping the edge of the ribbon between it and the movable jaw, and then upon the continuance of the travel draws the paper from the supply roll between the retaining rolls and across the whole upper surface of the die. During the action of said die, the slides 49 retreat to the position first described for the purpose of again feeding forward the ribbon for the succeeding operation. Coöperating with the die 35 is a male die 62 mounted upon a beam 63 guided by vertical slots 64 in the end-pieces of the frame. To the beam outside the end-pieces are secured eyes 65 (Figs. 1 and 2) to which are pivoted connecting rods 66 turning upon wrist-pins 67 projecting from the gears 58. As the cam-shaft revolves, the connecting rods raise and lower the beam bringing the male die into coöperation with the female die, the former having ribs entering the depressions between the ribs of the latter (Fig. 15). Carried by a flange outside the male die is an annular knife 68 having shearing engagement with the outer edge of the knife 36. This knife 68 contacts with the paper ribbon and cuts therefrom a circular blank before the male die enters the recess in the female die. This blank is thereupon carried down by the male die in its advance and corrugated as appears in Fig. 24, thus starting the formation of plaits therein as a step in the production of the vessel C. During this step an adhesive is applied to the corrugations in the cup through passages 69, 69 situated between the ribs of the female die and leading into an annular passage 70 in the block, the latter being connected at 71 with a source of supply. During the engagement between the dies 35 and 62 the doffer 37 was pressed down by the knife 68. As the beam carrying the male die rises at the end of the operation, the doffer is forced upwardly by its springs, thus raising the perforated section of the ribbon from which the blank was cut. This leaves the ribbon free to be again carried forward over the die 35 by the feeding members to present a fresh portion for a repetition of this operation.

The cup, the first stage of its formation being completed, is freed from the dies by clearing members 72 and 73 (Figs. 2ª, 4, 8 and 11). It will be understood that the cup may be held in contact with either die, so that means is provided for releasing it from both. The member 72 furnishes the bottom of the die 35, there being a head mounted upon a rod 74 reciprocating in a bore through the die, and having pivoted at its lower extremity a link 75 which is also articulated to an arm 76 fast upon a shaft 77 journaled in the frame. The shaft is rocked for the purpose of raising and lowering the clearing member 72 by an arm 78 provided with a projection entering a groove in a cam 79 fixed to the cam-shaft 57. The member 73 is in the form of a rod mounted to reciprocate through the male die, the die-beam and the top-bar of the frame, above the latter being connected to a link 80 which is pivoted at its upper end to an arm 81 secured to a shaft 82 journaled in brackets rising from the top-bar. Movement is communicated to the shaft 82 by a connecting rod 83 joined to an arm 84 fixed to the shaft 82, and having a projection entering a groove in a cam 85 rotatable by the cam-shaft 57. Beyond the connecting rod projection is a fork 86 straddling the cam-shaft and guiding the rod. As the male die rises the member 72 follows it, and if the cup has been left in contact with the female die raises it therefrom. As the movement of the male die continues upward the member 73 is thrust through it, detaching the cup, if it had instead remained upon said male die. In either event, the two clearing members meet and hold the cup in an elevated position between the dies (Fig. 4). With the partly formed cup in the position just described, it is seized by transfer mechanism (Figs. 3 and 4). This includes a fork 87 extending inward from a head 88 which is mounted to turn upon horizontal rods or shafts 89, 89. Pairs of links 90, 90 extend downwardly from the rods 89, 89 to shafts 91, 92 to which they are fixed, forming a parallel motion. The shafts are arranged to slide longitudinally through brackets projecting from the frame, travel in this direction being communicated to the shaft 91 by a lever 93 (Figs. 2 and 5) fulcrumed upon a base of the machine and pivoted to a collar 94 fixed to the shaft. From the lever is a projection engaging a groove in a cam 95 secured to the cam-shaft 57. Held against movement along the shaft 91 by separated projections from a bracket 96, but having engagement with the shaft to cause its oscillation by a spline and groove 97 (Fig. 1), is an arm 98, a projection from which coacts with the groove in a cam 99 upon the cam-shaft. As the partly formed cup is held between the clearing members, as previously described, the fork 87 is advanced toward it by the oscillation of the shaft 91, the arms of the fork embracing the cup. When this position has been attained, the clearing members retreat to their normal positions leaving the cup supported upon the fork. The shaft 91 is now moved longitudinally through its bearings by the operation of the cam 95, carrying the fork and cup with it until it reaches a point over a female die 100 (Figs. 5 and 12) by which the next operation is to be performed. The die-beam now descends again bringing with it a male die 101 for coöperation with the die 100. As die 101 reaches the cup, the supporting fork 87 retreats to its extreme outward position under the influence of the cam 99, and is then brought to its normal position in alinement with the first pair of dies by the cam 95. The dies 100 and 101 have at their coöperating surfaces the contour of the finished cup, this being of a slightly tapered frustoconical shape, as appears in Figs. 25 and 26. As the corrugated blank is pressed down between them the plaits are closed upon themselves, disposing of all the excess material in the side wall, the adhesive being distributed along the contacting faces of these plaits to hold them. At the same time a flange $c$ is formed by the pressure of the outer edge of the cup between the opposite surfaces 102, 102$^a$ of the female and male dies, respectively. Upon the separation of these dies, clearing and supporting members 103 and 104 act upon the cup in the same manner and actuated by means similar to the members 72 and 73 from the shafts 77 and 82.

As the male die 101 descended it carried with it a disk or cup-element $c'$ which is to be inserted within the cup for the purpose of providing a spacing means, separating the flanges of the cups by a predetermined distance when they are nested one within another. These disks $c'$ are contained in a tubular receiver 107 (Figs. 2, 20 and 21) supported in the frame, and having operating through the bottom a plunger 108 upon which a pile of the disks rest, said plunger being forced upwardly by a spiral spring 109. To hold the upper disk of the pile in a definite position at the top of the receiver against the tension of the spring, and regardless of the degree of elevation of the plunger, a flat spring 110 is mounted in a recess in the inner wall of the receiver, said spring having at its upper end an angular portion 111 situated adjacent to the top of the receiver. This angular portion overlaps the upper disk and thus limits the movement of the entire pile. Coöperating with the receiver is a feed member, consisting of a tube 112 rotatably mounted in a short arm 113 secured to a vertical shaft 114, said shaft being journaled in bearings in the frame member 34. Fixed to the outer end of the tube 112 is a head 115, of such form as to be adapted to enter the top of the receiver. It has at one side perforations 116 communicating with the passage through the tube, and when the head is carried into the receiver these perforations are immediately over the top disk of the supply therein. The opposite end of the tube 112 has a flexible connection 117 to some suitable means for intermittently producing a suction. At the extremity of the tube 112 at the inner side of its bearing in the arm 113 is a bevel-pinion 118 which meshes with a gear 119, the latter being fixed to some stationary portion of the machine, as the bearing of the shaft 114. The shaft 114 is oscillated by an arm 120 having a projection entering a groove in a cam 121 upon the cam-shaft. Before the descent of the die 101, by virtue of the rotation of shaft 114, the head 115 is started from its position within the top of the receiver, and draws, therefrom by the suction through its passages the upper disk, pressing aside the end of the spring 110 to permit this. Engagement between the bevel-pinion and fixed bevel-gear rotates the tube in its bearing in the arm, permitting the withdrawal of the head from the receiver and then inverting said head until in the revolution of the tube about the shaft 114 the disk is presented to the end of the male die 101. This die has through it passages 105, which are connected with a flexible pipe 130

105ᵃ to means for producing intermittent suction similar to that associated with the disk-delivering head. As the head presents the disk to the die the suction through the passages of the former ceases, while it is exerted through the passages of the latter. The disk is thereby transferred to the die and the head retreats to secure the disk for delivery to the succeeding cup. The descent of the male die carries the disk down and seats it in the bottom of the cup, it being held therein by its engagement with the plaited walls, which are pressed firmly against it by the coöperating dies. The cup is now in its final form, but the flange is uneven and must be trimmed. As has already been described, it is separated from the dies 100 and 101 and held between them as the male die rises by the members 103 and 104. Here it is seized by a fork 121ᵃ carried similarly to the fork 87 upon the rods 89, 89, and transferred to a point above a female trimming die 122 (Figs. 6 and 13) the same in form as the die 100, but having a cutting edge 123. The male die consists of a form 125 sliding upon a tube 126 depending from the underside of the body of the die. At the bottom of this tube is a flange 127 against which the form 125 is pressed by springs 128 situated in recesses in the form and die-body. Surrounding the upper edge of the form is an annular knife 129 coöperating with the cutting edge 123 of the female die. The descent of the die-beam carries the form into a cup, whereupon the supporting fork retreats, leaving the way clear for the cup to be carried down into the female die and here held in position by the form with the irregular flange overhanging the cutting edge 123. The downward movement of the die-body continues, resulting in the knife 129 shearing over the cutting edge and trimming the cup-flange to its correct form and width.

Now clearing and holding members 130 and 130ᵃ maintain the cup in the proper position to be seized by a fork 131 of the transfer mechanism and moved thereby beneath a holder 132, (Figs. 7 and 23), which is one of four depending from one of the arms of a spider 133 fast upon a shaft 134 journaled in the top and intermediate bars of the frame. As the transfer member delivers the cup beneath the holder, an elevating and pressure member 135, which is in the form of an arm pivoted upon a bracket projecting from the frame, is raised by the action of a link 136. This link is pivoted to an arm 137 fixed to a shaft 138 extending longitudinally of the frame and journaled therein, and upon which is secured an arm 139 provided with a projection running in a groove in a cam 140 secured to the shaft 57. When the cup has been firmly seated upon the holder by the member 135, the latter is lowered, and the spider assumes a new position removed by 90° from that with which it was supplied with the cup. This may be conveniently effected by a stop-movement of the Geneva type (Fig. 22), one member 141 being fixed to the lower end of the shaft 134, while the other 142 is attached to the upper end of a shaft 143 journaled in the standard 34. Shaft 143 is continuously rotated by a bevel-pinion 144 meshing with a similar pinion 145 upon the shaft 57.

The second position of the holder is that in which an advertisement or other inscription may be printed upon the cup. This is effected by a frusto-conical member 146 (Figs. 1, 9 and 10) carrying upon its surface type 147 arranged to print as desired and being fixed to the end of a shaft 148. This shaft is journaled in an oscillating arm 149 mounted upon a shaft 150 rotatable in the intermediate frame-bar. While movable about the shaft, the arm 149 is in frictional engagement therewith through disks 151, 151ᵃ, situated upon its opposite sides. The disk 151 has upon its side farthest from the arm a bevel-gear 152 and is secured to the shaft 150 to rotate therewith. The other disk 151ᵃ is forced into frictional engagement with the arm by a jam nut 153 threaded upon the shaft. Both the disks are preferably faced at 154 with leather or other suitable material to give the proper engagement with the arm. When the disk 151ᵃ is correctly adjusted toward the disk 151, the arm, engaged by the friction surfaces, is caused to rotate with the shaft 150, but to slip about the shaft when the printing or operating member 146 comes into contact with some other element of the machine. With the gear 152 meshes a pinion 155 fastened to the lower extremity of the shaft 148. Oscillation is communicated to the shaft through the arm 149 by a short arm 156 attached to one extremity of the shaft 150 and joined by a connecting rod 156ᵃ to a cam 157 mounted upon the cam-shaft, the connecting rod having a projection operating in the cam-groove and a fork 158 embracing the cam-shaft. The printing member 146 coöperates with a cup-holder 132 when the spider carrying the holders is in the second position, or that following the placing of the cup upon the holder. From its coöperation with the holder the printing member travels into contact with one of a series of inking rolls 159, here shown as three in number, mounted upon brackets rising from the bar 33 of the frame. These inking rolls, which may be of any suitable material and supplied with the ink which they are to distribute in some convenient manner not illustrated, are geared together at 160, the upper roll having an additional gear 161 meshing with a gear 162 upon the printing member. At its opposite or upward extreme of movement, when the printing roll contacts with the cups upon the holder, the gear 162 comes into mesh with a gear 163 upon the holder. The rotation of the inking roll by the printing member through the coöperation of the gears 161, 162, as the rotation of the shaft continues after the printing member has been forced against the upper inking roll, causes a uniform application of ink to the type, while the rotation of the holder 132 by the printing member results in the rolling of the type over the cup-surface and the printing of the inscription thereon. To permit this printing rotation of the holder, it is loosely mounted about a spindle (Fig. 23) secured in the spider-arm and having an enlargement 165 at its lower end upon which the holder rests and is free to turn.

In the next position of the spider, which for present purposes may be considered as the last in which the cup is acted upon, it is alined with a cup-displacing member (Fig. 1) provided by a rod 166 reciprocating through guides carried by the frame. To the upper end of this rod is pivoted a lever 167 fulcrumed above the frame and joined by a link 168 to an arm 169 fixed to shaft 82. This connection causes the correctly timed movement of the rod 166, which strikes the head of a rod 170 mounted to slide in the spindle supporting the holder, and having at its lower end a disk or plunger 171, which serves as a bottom to the holder and is forced against the cup thereon to displace it. Normally the plunger is held in a raised position against the holder by a spring 172 situated about the plunger-stem in a recess in the holder-spindle and contacting with the underside of the stem-head.

The action of the different operating sections of the machine will be clear from the detailed description of each, and it seems only necessary briefly to point out in regard to the entire organization, that the four operations of (1) cutting the blank from the ribbon of material, starting the formation of the plaits and applying the adhesive at the dies 35, 62; (2) completing the formation of the plaits and forming the flange at dies 100, 101; (3) trimming the flange by the knives 123, 129; and (4) printing by means of the member 146 upon the completed cup supported by one of the four holders 132 are all performed simultaneously. Furthermore, in alternation with this operating period, there is a feed and transfer period in which the ribbon of material is advanced through the first section by the jaws 49ª, 50, while the supporting forks 87, 121ª and 131, under the influence of the reciprocatory movement of translation and the oscillation of the parallel motion mechanism, simultaneously convey the cups which have just been operated upon from one section to the next, forks 87 and 121ª acting with the clearing rods 72, 73 and 103, 104, respectively, and fork 131 coöperating with the clearing rods 130, 130ª and pressure member 135. At the same time a completed cup is being thrown off its holder by the displacing member 171 and the rod 166. All these operations are entirely automatic and are performed rapidly and accurately.

While I have illustrated and described an automatic machine embodying my invention, the same is to be regarded as illustrative rather than definitive, as changes may be resorted to without departing from the spirit and scope of my invention as defined by the appended claims.

I claim:

1. A cup-making machine comprising means for simultaneously cutting a blank, starting the formation of plaits therein, and applying an adhesive to said plaits during their formation.

2. A cup-making machine comprising means for operating upon a blank to start the formation of plaits therein, and means for closing the plaits to bring the blank to cup-form and applying a spacing member to the cup.

3. A cup-making machine comprising means for simultaneously starting the formation of plaits in a blank and applying an adhesive to said plaits during their formation, and means for closing the plaits upon the adhesive.

4. A cup-making machine comprising means for operating upon a blank to start the formation of plaits therein, means for completing the formation of the plaits and producing a flange at the outside of the plaited portion, and means for trimming the flange, said means comprising independent trimming dies operating to trim the flange of the cup after it has been formed.

5. The combination with means for operating upon a cup, of two parallel shafts, means for oscillating and reciprocating one of said shafts, parallel arms fixed to the shafts, and a cup-support carried by the opposite extremities of the arms from the shafts.

6. In a cup-machine, the combination with a die having alternate ribs and depressions for producing cup plaits with adhesive-passages opening into the depressions for supplying an adhesive material to the plaits.

7. In a machine for making one piece paper cups, cup-forming means and means for supplying spacing members to the interior of the formed cups during their coöperation with the forming means.

8. The combination with cup forming means of a receiver adapted to hold a plurality of cup spacing members in vertical series, a feeding member movable from the top of the receiver to the forming means and means for inverting the feeding member during its movement to present a cup spacing member into delivery position.

9. The combination with means for operating upon a cup, of a feeding member for feeding cup spacing members from a stacked pile to a forming means, said feeding member comprising an oscillatory arm, a holding member upon the arm and means for inverting the holding member independently of the oscillatory movement of the arm to present a cup spacing member into delivery position.

10. A machine for making one piece paper cups including cup-forming means, of a receiver adapted to hold spacing members, means for removing said spacing members from the receiver to the forming means individually and means for oscillating and inverting said removing means.

11. The combination with a cup forming die, of a receiver for containing a plurality of cup spacing members, a member rotatable about its axis, a gear rotatable with the member, a fixed gear meshing with that of the member, and means for oscillating the member between the receiver, and die, so as to present the cup spacing members taken from the receiver into delivery position with respect to the forming die.

12. The combination with a plurality of pairs of cup forming members, clearing members mounted to reciprocate through the cup forming members and coöperating to hold the cup, actuating mechanism for the clearing members, said actuating mechanism comprising a rock shaft and connecting links, connecting the reciprocating clearing members with the rock shaft, said rock shaft adapted to impart reciprocal movement to all of the clearing members.

13. The combination with a series of cup-forming dies, of a movable member situated at the end of the series of dies, said member being provided with a plurality of cup-holders and being capable of occupying a plurality of positions, means for transferring a cup from the last die of the series to the holder in one position of the movable member, and means for operating upon the cup in another position of the member.

14. The combination with a series of cup-forming dies, of a rotatable member situated at the end of the series of dies, said member being provided with a plurality of cup-holders and being capable of occupying a plurality of positions, means for transferring a cup from the dies to a holder in one position of the rotatable member, and means for operating upon a cup carried by another holder.

15. The combination with a series of cup-forming dies, of a rotatable member situated at the end of the series of dies, said member being provided with a plurality of cup-holders and being capable of occupying a plurality of positions, means for transferring a cup from the dies to a holder in one position of the rotatable member, means for operating upon the cup in another position of the member, and means for removing the cup from the holder in still another position of the member.

16. The combination with cup-forming means, of a movable cup-holder, movable means for transferring a cup from the forming means to the holder, and means for forcing the cup from the transfer means upon the holder.

17. The combination with cup-forming means, of a movable member provided with a cup-holder capable of occupying a plurality of positions, transfer means movable from the forming means to the holder in one position of the movable member, and means for printing upon said cup in another position of the member.

18. The combination with cup-forming mechanism, of a rotatable spider, a plurality of cup-holders carried by separate arms of the spider and each adapted to receive a cup upon its exterior, and an oscillatory member movable into proximity with the bottoms of the holders to force the cup upon the holders.

19. In a machine for making paper receptacles, the combination of flute-forming mechanism including radial members over which the blank may be fluted, means for pressing the flutes flat upon each other to form plaits, and ducts with ports through which an adhesive is applied to the plaits to hold them together.

20. In a cup-making machine, the combination of the following instrumentalities:— means including radially-disposed members coöperating to flute a blank of paper and impart thereto the form of a receptacle, a pair of coöperating dies to receive the formed receptacle and act thereupon to form an outwardly-extending flange at its open end and means for applying an adhesive to cement the plaits and strengthen the walls and flange of the receptacle.

21. In a machine for making paper receptacles, the combination of forming mechanism including radially-disposed plaiting members, adapted to act upon a blank of paper, means for pressing the formed plaits of the blank together and means for applying an adhesive to the plaits to supplement the applied pressure in holding the plaits together.

22. In a cup making machine, the combination of plaiting means, coöperating cup forming means, an adhesive applying means and means for forming an outwardly-extending flange at the open end of the receptacle.

23. In a cup making machine, the combination of means for acting upon a blank of paper and forming it into a plaited receptacle, and means for applying an adhesive to hold the plaits together and strengthen the formed receptacle.

24. In a cup making machine, means for plaiting a disk of paper and forming it into the shape of a cup, means for temporarily holding said plaited cup and means for applying an adhesive thereto.

25. In a cup making machine, comprising means for operating upon a blank to start the formation of plaits therein, means for closing the plaits to bring the blank to cup form, and means for applying an adhesive to said plaits to hold the same in position.

26. In a cup making machine, the combination of plaiting mechanism for forming a blank paper in receptacle form having overlapping layers of paper, means for forming an outwardly-extending rim or flange portion on the receptacle, means for applying an adhesive compound to said overlapping layers of paper to hold them in form and strengthen the walls and rim of the receptacle.

27. In a cup making machine, the combination of the following instrumentalities:— plaiting mechanism provided with radially-disposed plaiting members adapted to act upon a blank of paper and shape it into receptacle form, means for forming an outwardly-extending flange at the open end of the receptacle, means for applying pressure and an adhesive to the plaits to maintain them in form.

28. In a cup making machine the combination of plaiting mechanism for acting upon a blank to press it into the form of a cup, means for forming a laterally and outwardly extending flange at the open end of said cup, said flange terminating in a free circumferential edge spaced from the side walls of the cup, and means for applying an adhesive to the cup to hold the plaits together and strengthen the side walls and flange portion thereof.

29. A cup making machine comprising means for operating upon a blank of paper to start the formation of plaits therein, means for compressing the plaits and producing a flange at the outside of the plaited portion, and means for applying an adhesive to hold said plaits together.

Signed, at Hyde Park, in the county of Norfolk and State of Massachusetts, this 18th day of October, 1911.

EUGENE H. TAYLOR.

Witnesses:
FRED A. RICH,
HIRAM E. B. WALDRON.